United States Patent [19]

Fitzgibbon et al.

[11] Patent Number: 5,344,103

[45] Date of Patent: Sep. 6, 1994

[54] ACTUATING SYSTEM FOR AIRCRAFT WING SLAT AND FLAP PANELS

[75] Inventors: Thomas F. Fitzgibbon, Long Beach; Paul U. Hamilton, Palos Verdes Est., both of Calif.

[73] Assignee: AlliedSignal, Inc., Morris Township, Morris County, N.J.

[21] Appl. No.: 825,664

[22] Filed: Jan. 24, 1992

[51] Int. Cl.$^5$ ............................................ B64C 9/06
[52] U.S. Cl. ..................... 244/75 R; 244/213; 244/215
[58] Field of Search ............... 244/75 R, 78, 213, 215, 244/216, 214, 219

[56] References Cited

U.S. PATENT DOCUMENTS

| | | | |
|---|---|---|---|
| 1,813,485 | 7/1931 | Cook, Jr. | 244/214 |
| 2,696,954 | 12/1954 | Harmon et al. | 244/203 |
| 3,140,066 | 7/1964 | Sutton et al. | 244/215 |
| 3,767,140 | 10/1973 | Johnson | 244/216 |
| 4,159,089 | 6/1979 | Cole | 244/214 |
| 4,172,575 | 10/1979 | Cole | 244/216 |
| 4,213,587 | 7/1980 | Roescler et al. | 244/213 |
| 4,248,105 | 2/1981 | Downing et al. | 475/158 |
| 4,305,177 | 12/1981 | Feifel | 244/215 |
| 4,470,366 | 9/1984 | Williams | 114/280 |
| 4,614,320 | 9/1986 | Rutan | 244/216 |
| 4,717,097 | 1/1988 | Sepstrup | 244/215 |
| 5,161,757 | 11/1992 | Large | 244/216 |

Primary Examiner—Michael S. Huppert
Assistant Examiner—Anne E. Bidwell
Attorney, Agent, or Firm—James W. McFarland; Robert A. Walsh

[57] ABSTRACT

An actuating system effects rotation of wing slat and flap panels of an aircraft and includes actuators having arms rigidly mounted to the panel and allowing some wing-to-panel rotation during wing/panel bending, and actuators having arms mounted to the panel to allow angular displacement of the arms relative to the rigidly mounted arms, whereby structural deflection of the frame of the aircraft is inhibited from imposing unanticipated destructive loads on either the actuating system components or the aircraft frame itself.

10 Claims, 4 Drawing Sheets

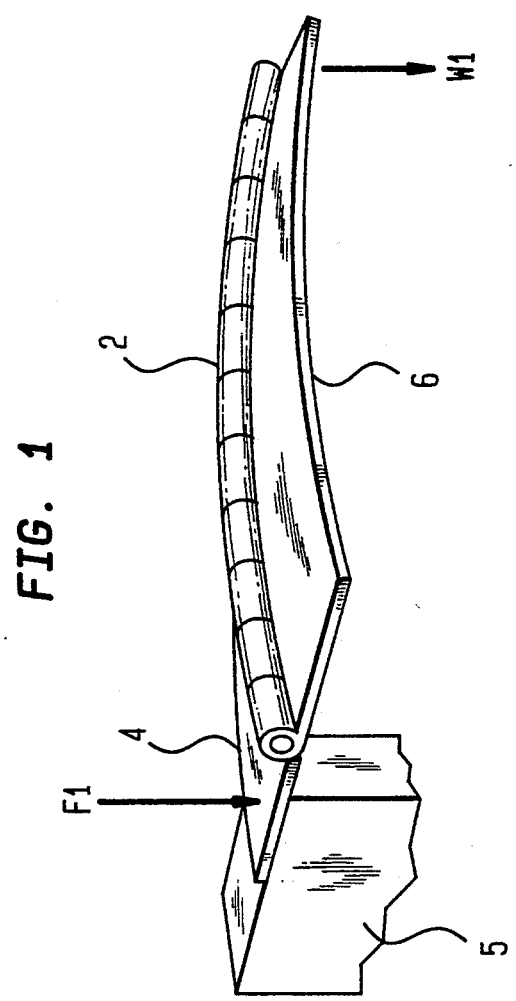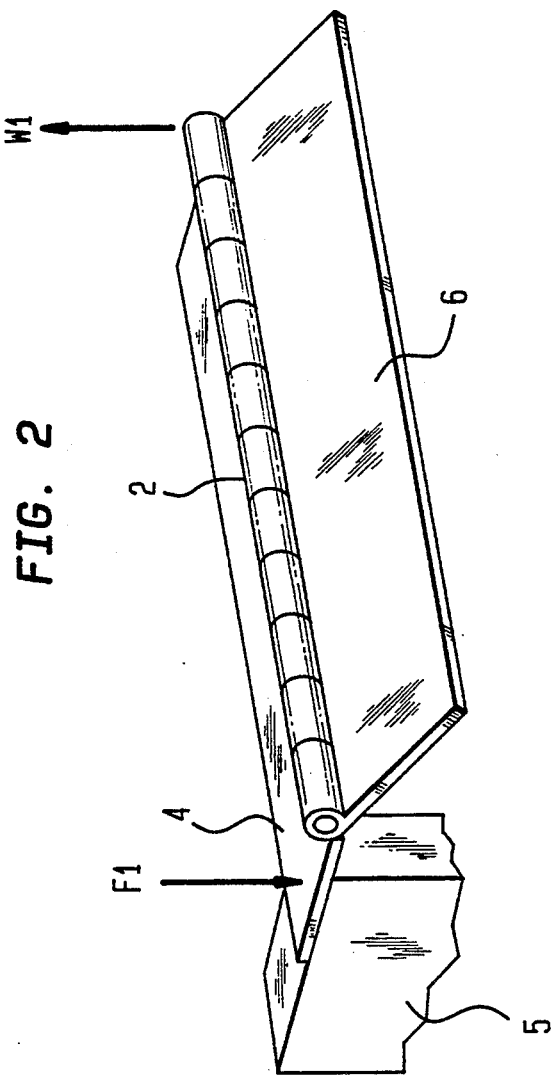

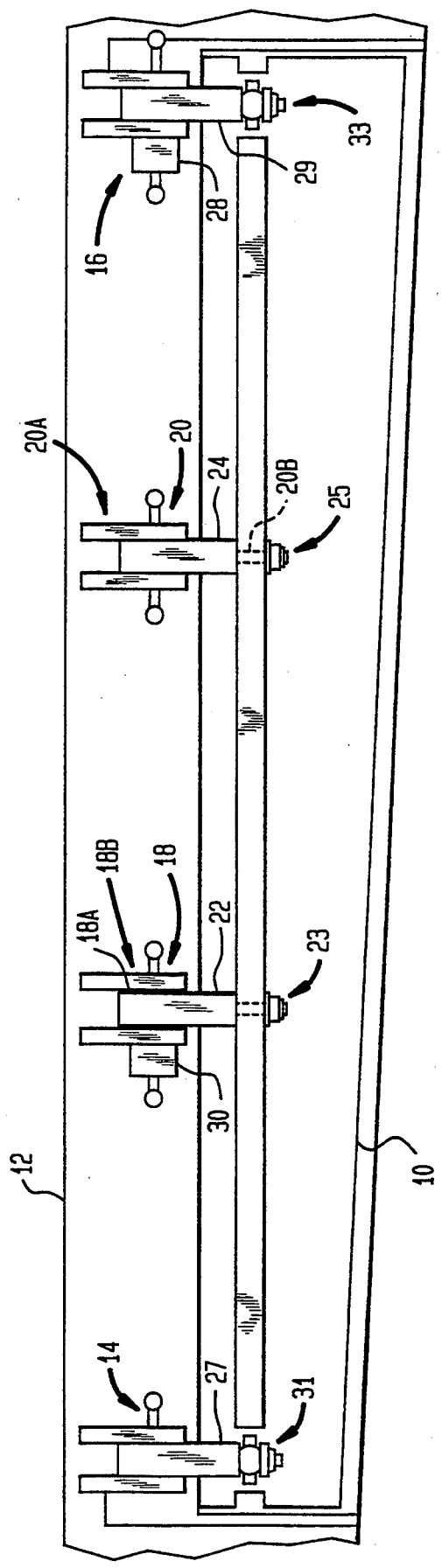

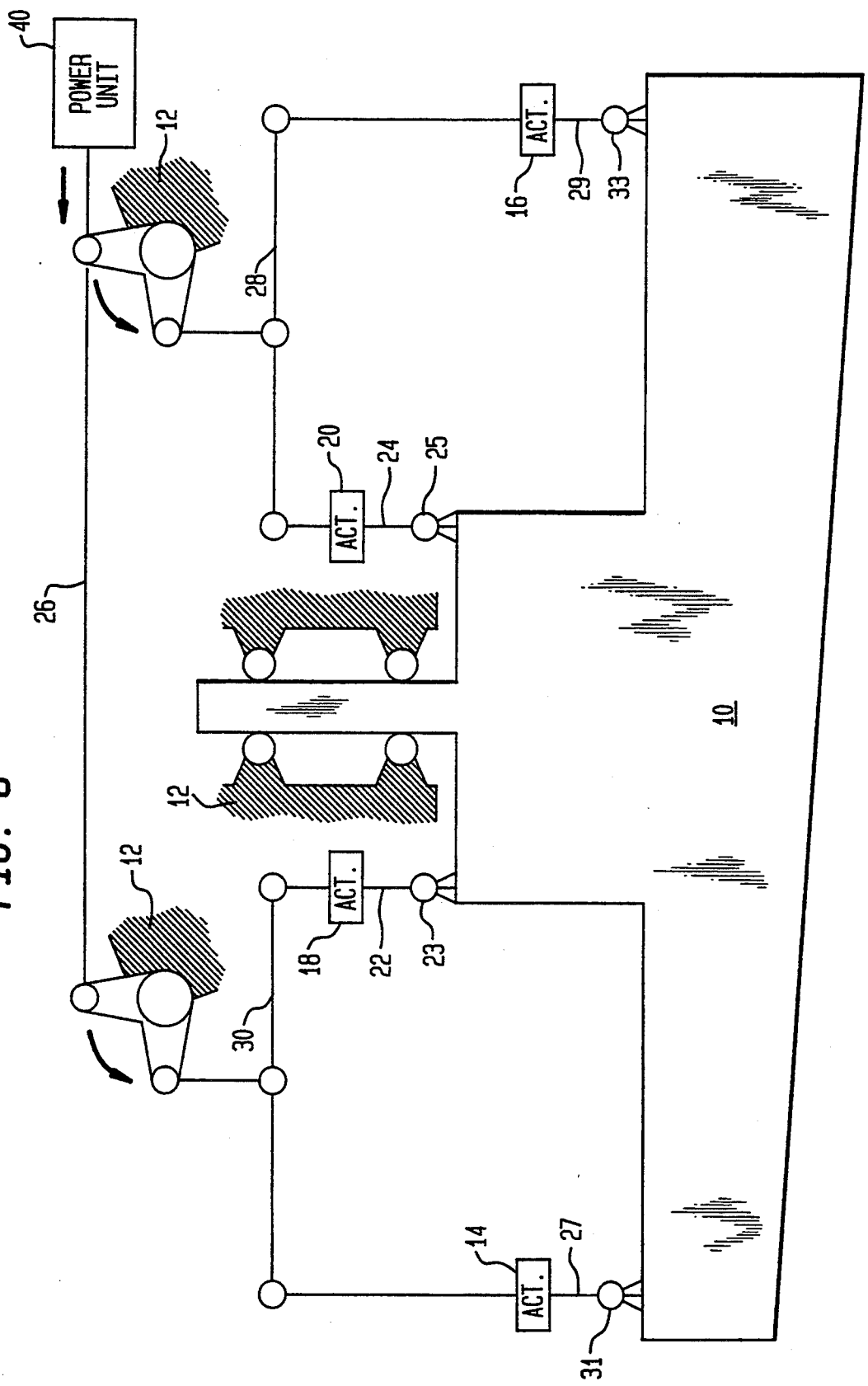

ACTUATING SYSTEM FOR AIRCRAFT WING SLAT AND FLAP PANELS

BACKGROUND OF THE INVENTION

This invention relates generally to actuating systems for aircraft wing leading edge slat and trailing edge flap panels and, particularly, to actuation systems of the type described whereby structural deflection of the airframe is inhibited from imposing unanticipated loads on either the actuating system components or on the airframe itself. More particularly, this invention relates to actuating systems including actuators for rotating the panels, wherein the actuators function as hinges for the panels as well as power units.

Various aircraft can benefit from an arrangement according to the present invention. For purposes of example, the leading edge wing slat system of the F-16 aircraft carries a long, full span slat panel powered by four actuators spaced along the wing length. The actuators also function as hinges for slat rotation. The actuators include gear arrangements, each having the same gear ratio, and input shafts connected via a torque tube to a hydraulic power unit. For a description of the F-16 leading edge slat system, reference is made to pages 155 and 157 of "The Great Book Of Modern War Planes", published by Portland House Publishing Company.

Historically, routine inspection of F-16 aircraft after exceeding two hundred hours of operational flying, has uncovered signs of excessive wear in the actuating mechanism controlling the position of the leading edge slat panel. Like problems continue to date with F-16 aircraft currently in service.

The present invention tends to alleviate this problem.

The applicants are aware of U.S. Pat. No. 4,470,366 (U.S. Class 114/280) which issued to Williams on Sep. 11, 1984; U.S. Pat. No. 3,140,066 (U.S. Class 244/42) which issued to Sutton on Jul. 7, 1964; and U.S. Pat. No. 1,813,485 (no class indicated) which issued to Cook on Jul. 7, 1931.

The Williams patent discloses a hinge for a hydrofoil wherein a foil is provided with an integral comb-like hinge member having hinge elements which are interfitted with hinge elements of a hinge block via a pin. The flap leading edge of the hydrofoil is fixedly secured to the hinge block at two span-wise inboard and outboard points defining "hard" pivotal connections wherein relative movement between the hinge block and flap is restrained. Intermediate the "hard" points, fore and aft relative sliding movement of the hinge block within the flap leading edge slot is permitted.

The Sutton patent discloses mounting means comprising hinge assemblies for supporting a flap on a wing of an aircraft. Two of the hinge assemblies are floating and are located intermediate the other two hinge assemblies which include a ball element associated with a hinge pin. A floating hinge is disposed between a pair of stable hinges. An intermediate link on the floating hinge permits fore and aft movement of a pivotal axis when the flap and wing are in the deflected state.

The Cook patent teaches a control mechanism for aircraft wherein a differential mechanism transmits motion to shafts in order to change the camber and angle of incidence of an air foil.

In regard to the Sutton patent, reference is made to U.S. Pat. No. 4,305,177 (U.S. Class 16/162) which issued to Feifel on Dec. 15, 1981, wherein a hinge pin is disclosed. With reference to the Cook patent, reference is made to U.S. Pat. No. 2,696,954 (U.S. Class 244/42) which issued to Harmen, et al on Dec. 14, 1954.

None of the aforementioned patents appear to teach, either singly or in combination, the structural arrangement herein disclosed.

The applicants are also aware of U.S. Pat. No. 4,248,105 (U.S. Class 74/710.5) which issued to Downing, et al on Feb. 3, 1981; U.S. Pat. No. 4,159,089 (U.S. Class 244/214) which issued to Cole on June 26, 1979; and U.S. Pat. No. 4,213,587 (U.S. Class 244/213) which issued to Roeseler, et al on Jul. 22, 1980. These patents are considered by the applicants to be of general interest only.

SUMMARY OF THE INVENTION

This invention contemplates an actuating system for aircraft wing leading edge slat and trailing edge flap panels wherein actuators for the panels function as hinges as well as power units. The actuating system includes a plurality of actuators, which are powered by gear arrangements coupled to a coaxial input shaft. The shaft is coupled to a power unit. The actuators have arms which are either rigidly mounted to a panel in a manner which allows some wing to panel rotation or are mounted to the panel so as to be slidable fore and aft therewithin. The coaxial input shaft drives the actuators through differential gear arrangements, whereby selected actuators operate as a unit. The actuator arrangement tends to inhibit structural deflection of the airframe from imposing destructive loads on the actuating system and on the airframe itself.

Accordingly, this invention contemplates an actuating system for aircraft wing slat and flap panels comprising: a plurality of actuators spaced along an aircraft wing for hinging a panel to the wing and for rotating the panel; a coaxial input shaft coupled to a power unit and coupled to each of the plurality of actuators for driving said actuators, and each of said actuators having an arm mounted to the panel; a first pair of the plurality of actuators; means for mounting the arms of each of the actuators of the first pair to the panel so as to permit wing to panel rotation during wing/panel bending; a second pair of the plurality of actuators; means for mounting the arms of each of the second pair of actuators to the panel so as to permit angular displacement of said arms relative to the arms of the first pair so that the panel does not resist wing bending via the actuators; differential gear means coupling the coaxial input shaft to the arms of the actuators in the first and second pairs for permitting relative angular displacement between selected actuator arms in said first and second actuator pairs and for permitting one of the arms in each of the first and second pairs to be angularly displaced as a unit; and said angular displacement of said actuator arms in said first and second pairs tending to inhibit structural deflection of the frame of the aircraft from imposing destructive loads on the actuating system and on the aircraft frame itself.

BRIEF DESCRIPTION OF THE DRAWINGS

FIGS. 1 and 2 diagrammatic isometric representations illustrating the problem which the present invention tends to alleviate.

FIG. 3 is a diagrammatic plan view representation generally illustrating the actuator arrangement of the invention.

FIG. 8 is a schematic representation illustrating the features of the invention.

DETAILED DESCRIPTION OF THE INVENTION

Figure 4:
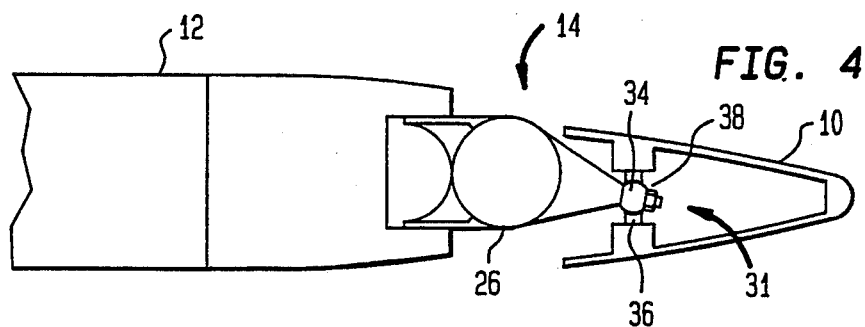
FIG. 4 is a diagrammatic side view representation illustrating one actuator in an undeflected position.

It is well understood that actuator and airframe problems such as the present invention tends to alleviate have more to do with the actuator system installation on the aircraft than with the detailed design of the actuator system itself. If one examines the method of attaching each actuator to the front beam of a wing, it will be seen that gear misalignment is inevitable. If one examines the load distribution and misalignment on the actuator gear teeth and bearing surfaces during wing bending conditions, an even worse situation appears imminent.

The fundamental problem presented by present aircraft slat and flap panel actuating systems is perhaps best illustrated by FIGS. 1 and 2. Thus, a hinge 2 couples a leaf 4 to a leaf 6. Leaf 4 represents the wing of an aircraft, and is secured at one end thereof to a rigid member 5 such as the aircraft frame as by a force F1 to form a cantilever beam. Leaf 6, which is a free leaf, represents a slat or flap panel. With leaf 6 undeflected as shown in FIG. 1, a weight W1 suspended from the free end of the hinge/panel assembly causes a deflection of the assembly as shown. If leaf 6 is deflected or rotated as shown in FIG. 2, the stiffness of the hinge/panel assembly will be greatly increased and the assembly will straighten so as to raise weight W1. It will be recognized that very little rotational force is required to lift a relatively heavy weight W1, i.e. a large mechanical advantage is realized by rotating leaf 6. This illustrates what occurs with current panel actuating systems which impose unanticipated destructive loads on either the actuator system components or on the aircraft frame itself. The present invention tends to alleviate this problem as will be discerned from the description thereof which follows.

With reference to FIG. 3, a slat or flap panel, as the case may be, is designated by the numeral 10. Panel 10 is hinged to an aircraft wing 12 via a first pair of actuators 18 and 20 and a second pair of actuators 14 and 16. Arms 22 and 24 of actuators 18 and 20, respectively, are rigidly mounted to panel 10 via pin connections 23 and 25, respectively, as they are in present actuating arrangements. Arms 27 and 29 of actuators 14 and 16, respectively, are mounted to panel 10 via ball joint connections 31 and 33, respectively, as will be hereinafter described. It will be noted that only as much of the actuator system as is necessary to understand the invention will be herein illustrated and described.

Figure 5:
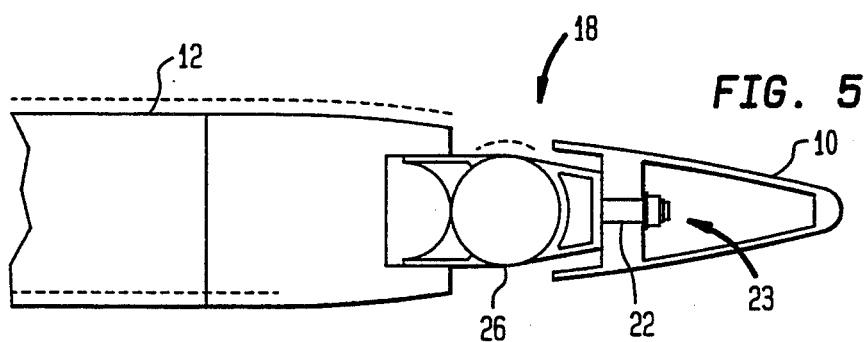
FIG. 5 is a diagrammatic end view representation illustrating an other actuator in an undeflected position.
Figure 7:
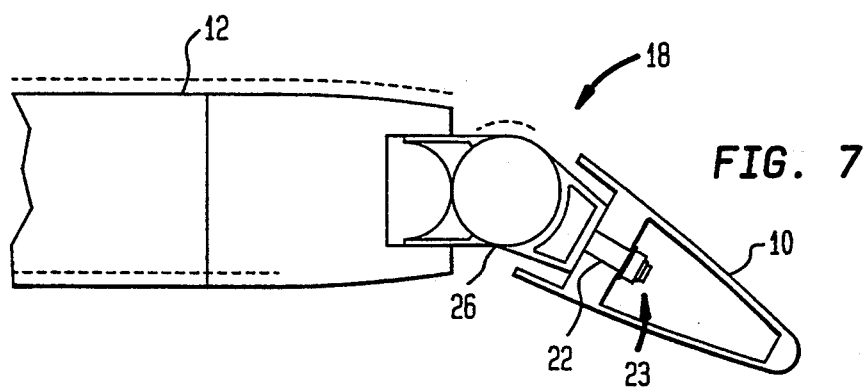
FIG. 7 is a diagrammatic end view representation illustration the other actuator in a deflected or rotated position.

Reference is now made to FIGS. 5 and 7 wherein pin connection 23 is shown for illustration purposes. The pin connections allow some wing-to-panel rotation during wing/panel bending. Thus, actuator 18 shown in the Figures, and actuator 20 (FIG. 3) as well, impart angular displacement to panel 10 with respect to wing 12 and may determine its angle of attack. For purposes of describing the invention, the first pair of actuators 18 and 20 have been selected to perform this function. The choice of these actuators in the arrangement described is seen to allow the least mismatch of the panel and wing surfaces during wing/panel flexure. Depending upon the relative deflection of wing-to-panel, actuator spacing, etc., other actuator locations might be "master" locations as the locations of actuators 18 and 20 have herein been designated. Further, it should be noted that the arrangement herein described is not limited to four actuators per panel, but actually applies to any system with three or more actuators per panel as will be discerned.

Figure 6:
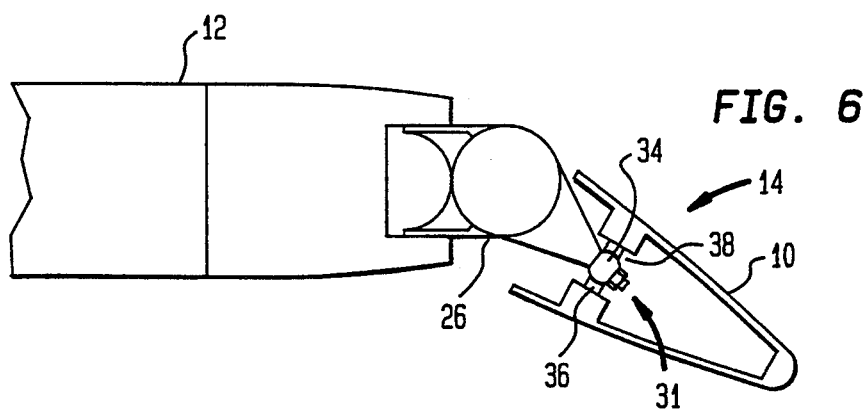
FIG. 6 is a diagrammatic end view representation illustrating the one actuator in a deflected or rotated position.

The mounting arrangement for the second pair of actuators 14 and 16 is illustrated in FIGS. 4 and 6 wherein actuator 14 is particularly shown for illustration purposes. This arrangement allows angular displacement of the actuator arms relative to the arms of actuators 18 and 20 such that panel 10 does not resist wing bending (or vice-versa) via the actuators.

As particularly shown in FIG. 3, a differential gear arrangement 28 is disposed between actuator 16 and actuator 20, and a differential gear arrangement 30 is disposed between actuator 18 and actuator 14. Differential gear arrangements 28 and 30 permit relative angular displacement between arms 24 and 29 of actuators 20 and 16, respectively, and between arms 22 and 27 of actuators 18 and 14, respectively. In the rotational sense, actuators 18 and 20 operate as a single actuator.

With continued reference to FIGS. 4 and 6, ball joint connection 31 shown for purposes of illustration includes a self-aligning ball joint 34 which fits into a rectangular block 36. Rectangular block 36 is slidable fore and aft and laterally in a closely fitted rectangular hole 38 in the rear beam of panel 10. Thus, the actuator arm determines the mean vertical position of the panel but does not resist panel/Wing flexure, panel torsional windup and lateral growth of the panel, as might otherwise be the case. Ball joint connection 33 has the same configuration, function and purpose.

Coaxial input shaft 26 shown in FIGS. 414 7 couples the aforementioned actuators to a power unit 40 (FIG. 8), as in previous arrangements.

The arrangement described is shown in linear fashion in FIG. 8. Thus, coaxial input shaft 26, coupled to a power unit 40, which, in present arrangements drives actuators 14, 16, 18 and 20 directly, now drives actuator 16 and actuator 20 through differential gear arrangement 28 and drives actuator 14 and actuator 18 through differential gear arrangement 30. Actuators 18 and 20 rotate as a single actuator, as aforenoted.

It is apparent from FIG. 8 that there is load equalization across differential gear arrangements 28 and 30 and this must be accommodated in designing panel 10 and the actuating system therefor. Theoretically, if the center-of-lift of panel 10 is coincident with the center 10 of the ball joints in ball joint connections 31 and 33 for actuators 14 and 16, respectively, as described with reference to FIGS. 4 and 6, no torsion due to aerodynamic loading is carried across panel 10 to actuators 18 and 20.

The actuating system must also accommodate lateral displacement of panel 10 caused by thermal transience and structural deflection. In this connection, reference is again made to FIG. 3 wherein it will be discerned that lateral positioning of panel 10 is determined by actuator 20. The radial/thrust bearings 20A of actuator 20 preclude lateral motion as actuator arm 24 is rigidly affixed to panel 10 via pin connection 25. However, the panel can rotate around mounting pin 20B on actuator arm 24 during wing-to-slat deflection. Note that actuator 18 (FIG. 3) has endplay 18A in its bearing arrangement 19B to allow panel growth. Actuators 14 and 16 interface with the previously described sliding blocks in the rear beam of panel 10 which provide the necessary lateral freedom.

All actuators provide wing-to-panel bending freedom without imposing cocking loads on the actuator bearing arrangements such as 18B. This feature is effected by pin connections 23 and 25 for actuators 18 and 20, respectively, and by ball joint connections 31 and 33 for actuators 14 and 16, respectively.

Specific hardware designs will be required for specific applications. Other designs may be substituted for the described ball joint and sliding block arrangements. Mounting lugs attaching the actuators to the wing front beam may also need to be modified from those currently used. Differential gear units 28 and 30 may use bevel gear or spur gear designs, as the case may be.

With the above description of the invention in mind, reference is made to the claims appended hereto for a definition of the scope of the invention.

What is claimed is:

1. An actuating system for aircraft wing slat and flap panels, comprising:
   a plurality of actuators spaced along an aircraft wing for hinging a panel to the wing and for rotating the panel, the plurality including first and second pairs of actuators;
   a coaxial input shaft coupled to a power unit and coupled to each of the plurality of actuators for driving said actuators, each actuator of said first and second pairs of actuators having an arm mounted to the panel;
   means for mounting the arms of each actuator of the first pair to the panel so as to permit wing to panel rotation during wing/panel bending;
   means for mounting the arms of each actuator of the second pair to the panel so as to permit angular displacement of said arms relative to the arms of the actuators of the first pair so that the panel does not resist wing bending via the actuators; and
   differential gear means coupling the coaxial input shaft to the arms of the actuators in the first and second pairs for permitting relative angular displacement between selected actuator arms in said first and second actuator pairs and for permitting one of the arms in each of the first and second pairs to be angularly displaced as a unit.

2. An actuating system as described by claim 1, wherein the means for mounting the arms of each of the actuators of the first pair to the panel includes:
   means for fixedly mounting said arms to said panel.

3. An actuating system as described by claim 2, wherein:
   the means for fixedly mounting said arms to said panel includes a pin connection between each of said arms and said panel.

4. An actuating system as described by claim 1, wherein the means for mounting the arms of each of the second pair of actuators to the panel includes:
   means for mounting said arms to said panel so that the arms determine the mean vertical position of the panel while not resisting panel/wing flexure, panel torsional windup and panel lateral growth.

5. An actuating system as described by claim 4, wherein:
   the means for mounting said arms to said panel includes a ball joint connection between each of said arms and said panel which is slidable fore and aft and laterally in said panel.

6. An actuating system as described by claim 4, wherein:
   the means for mounting said arms to said panel imparts angular displacement to the panel and determines the angle of attack thereof.

7. An actuating system as described by claim 1, wherein the differential gear means includes:
   a first differential gear arrangement coupling the coaxial input shaft to the arm of one of the actuators in the first pair and to the arm of one of the actuators in the second pair;
   a second differential gear arrangement coupling the coaxial input shaft to the arm of the other of the actuators in the first pair and to the arm of the other of the actuators in the second pair.

8. An actuating system as described by claim 7, wherein:
   the one of the actuators in the first pair and the one of the actuators in the second pair are included in an inboard pair of actuators; and
   the other of the actuators in the first pair and the other of the actuators in the second pair are included in an outboard pair of actuators.

9. An actuating system as described by claim 8, wherein:
   the one of the actuators in the second pair included in the inboard pair of actuators is arranged to allow lateral growth of the panel.

10. An actuating arrangement as described by claim 8, wherein:
    the other of the actuators in the second pair included in the inboard pair of actuators is arranged to determine the lateral positioning of the panel.

* * * * *